United States Patent
Ho et al.

(10) Patent No.: US 7,315,434 B2
(45) Date of Patent: Jan. 1, 2008

(54) MAGNETIC DISK DRIVE APPARATUS SUPPORT ARM FIXING STRUCTURE

(75) Inventors: Yiu Sing Ho, Hong Kong (CN); Takehiro Kamigama, Hong Kong (CN); Masashi Shiraishi, Hong Kong (CN)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 347 days.

(21) Appl. No.: 10/986,097

(22) Filed: Nov. 12, 2004

(65) Prior Publication Data

US 2005/0105211 A1 May 19, 2005

(30) Foreign Application Priority Data

Nov. 18, 2003 (JP) .............................. 2003-387714

(51) Int. Cl.
*G11B 5/012* (2006.01)
(52) U.S. Cl. .................................................. 360/97.01
(58) Field of Classification Search ..................... None
See application file for complete search history.

(56) References Cited

U.S. PATENT DOCUMENTS 4,894,735 A * 1/1990 Takahashi et al. ....... 360/97.01
5,021,905 A * 6/1991 Sleger ...................... 360/97.02
5,029,027 A * 7/1991 Sleger ...................... 360/97.03
5,875,067 A * 2/1999 Morris et al. ............ 360/97.01
6,256,165 B1 * 7/2001 Kim ........................ 360/97.01

FOREIGN PATENT DOCUMENTS

JP         6-215513        8/1994

* cited by examiner

*Primary Examiner*—David D. Davis
(74) *Attorney, Agent, or Firm*—Oblon, Spivak, McClelland, Maier & Neustadt, P.C.

(57) ABSTRACT

A magnetic disk drive apparatus includes a housing member with at least one opened face, a cover member for covering the at least one opened face of the housing member, a head gimbal assembly including a magnetic head slider and a suspension for supporting the magnetic head slider, a support arm for supporting the head gimbal assembly, a magnetic disk to which the magnetic head slider opposed, and a motor for rotating the magnetic disk. The magnetic disk and the motor are attached to the housing member. The support arm is fixed to the cover member using a clamping hole formed through the cover member. The cover member has a local deformation structure that is capable of locally deforming and formed around the clamping hole.

7 Claims, 4 Drawing Sheets

MAGNETIC DISK DRIVE APPARATUS SUPPORT ARM FIXING STRUCTURE

PRIORITY CLAIM

This application claims priority from Japanese patent application No. 2003-387714, filed on Nov. 18, 2003, which is incorporated herein by reference.

BACKGROUND OF THE INVENTION

1. Field of the Invention

The present invention relates to a magnetic disk drive apparatus.

2. Description of the Related Art

In a magnetic disk drive apparatus or a hard disk drive (HDD) apparatus, a thin-film magnetic head element for writing magnetic information into and/or reading magnetic information from a magnetic disk or a hard disk is in general formed on a magnetic head slider flying in operation above the rotating magnetic disk. The slider is supported at top end section of a suspension of a head gimbal assembly (HGA).

The HDD apparatus has in general a housing member with an opened top face and a cover member for covering the top face to accommodate inside at least one magnetic disk, a drive motor for rotating the disk, at least one HGA with a magnetic head slider, a suspension and a lead conductor member, a support arm for supporting the at least one HGA, and an actuator such as a voice coil motor (VCM) for swinging the support arm in a plane parallel to the magnetic disk.

In the conventional HDD apparatus, as disclosed in Japanese patent publication No. 06-215513 A2, these main components such as the magnetic disk, the drive motor, the HGA, the support arm and the VCM are attached to the housing member, but are not attached to the cover member. The cover member is used only for covering the opening of the housing member to seal the HDD apparatus.

In such the conventional HDD apparatus, both the magnetic disk with a recording surface that should be kept free of contamination and the HGA are attached to the housing member side. Therefore, when the HGA has to be replaced due to malfunctions after assembling in the HDD apparatus, it is necessary to pay close attention to prevention of the contamination of the magnetic disk surface.

In the conventional manufacturing process of the HDD apparatus, in general, first the magnetic head slider is attached to the suspension to form an HGA that has a proper size for a worker to easily handle, and then the HGA is assembled in the HDD apparatus by the worker. Thus, a thin-film magnetic head element formed on the slider is sometimes destroyed by electrostatic discharge (ESD). Thus, in case that the thin-film magnetic head element of the slider is a magnetoresistive effect (MR) element, particularly, a giant magnetoresistive effect (GMR) element or a tunneling magnetoresistive effect (TMR) element, it must give special consideration to the prevention of possible ESD destruction.

In order to solve the aforementioned problems in the conventional HDD apparatus, the applicants have already proposed an HDD apparatus having a housing member, a cover member fixed to the housing member for covering its opened face, an HGA including a magnetic head slider and a suspension for supporting the magnetic head slider, a support arm for supporting the HGA, a magnetic disk and a motor for rotating the magnetic disk, wherein the magnetic disk and the motor are attached to the housing member and the support arm is attached to the cover member. This proposed HDD apparatus is not known in public at filing of this application.

In case main components except for the magnetic disk and the motor are mounted on the cover member, it is important that a distance between the components attached to the cover member and the magnetic disk or the housing member is precisely established. Particularly, a distance between the HGA including the support arm and the housing member and a distance between the ramp attached to the cover member for ramp loading and the housing member should be kept in precise.

However, when these components are fixed to the cover member by screws, the whole of the cover member may be distorted due to the tightening force of the screws and thus it may be difficult to precisely keep the above-mentioned distance.

BRIEF SUMMARY OF THE INVENTION

It is therefore an object of the present invention to provide a magnetic disk drive apparatus, whereby in case main components except for the magnetic disk and the motor are mounted on the cover member, it is possible to precisely keep a distance between these and the housing member.

According to the present invention, a magnetic disk drive apparatus includes a housing member with at least one opened face, a cover member for covering the at least one opened face of the housing member, a head gimbal assembly including a magnetic head slider and a suspension for supporting the magnetic head slider, a support arm for supporting the head gimbal assembly, a magnetic disk to which the magnetic head slider opposed, and a motor for rotating the magnetic disk. The magnetic disk and the motor are attached to the housing member. The support arm is fixed to the cover member using a clamping hole formed through the cover member. The cover member has a local deformation structure that is capable of locally deforming and formed around the clamping hole.

Because the cover member has a local deformation structure that is capable of locally deforming around the clamping hole, if a fastening member such as a screw is inserted in the clamping hole and tightly fastened in order to fix the support member to the cover member, only the area around the clamping hole is locally deformed but the whole of the cover member is never deformed. As a result, in case that the main components except for the magnetic disk and the motor are mounted on the cover member, it is possible to precisely keep the distance between these main components and the magnetic disk or the housing member.

In addition, because the support arm with the HGA having the magnetic head slider and the suspension are attached to the cover member, whereas the magnetic disk and the motor are attached to the housing member, it is possible to assemble the HGA in isolation from the housing member provided with the magnetic disk of which surface has to keep clean. Thus, flexibility of tools or devices used for assembling the HGA can be increased and also assembling itself can be performed with a high degree of efficiency. Furthermore, when replacing the HGA already assembled in the HDD apparatus, the replacement work can be performed by detaching only the cover member from the HDD apparatus, namely by treating only the cover member in isolation from the housing member, no contamination of the disk surface can be induced and also the replacement can be effectively executed.

It is preferred that the local deformation structure includes a plurality of cut-in holes formed around the clamping hole.

It is also preferred that the clamping hole is a screw hole coaxially with a rotation axis of the support arm.

It is preferred that the apparatus further includes a ramp preliminarily attached to the cover member, on which the support arm sits when the apparatus is out of operation.

It is also preferred that the apparatus further includes an actuator for rotatively moving the support arm in parallel with a surface of the magnetic disk. A part of the actuator is attached to the cover member.

It is preferred that the remaining part of the actuator is attached to the housing member.

Further objects and advantages of the present invention will be apparent from the following description of the preferred embodiments of the invention as illustrated in the accompanying drawings.

DETAILED DESCRIPTION OF THE INVENTION

Figure 1:
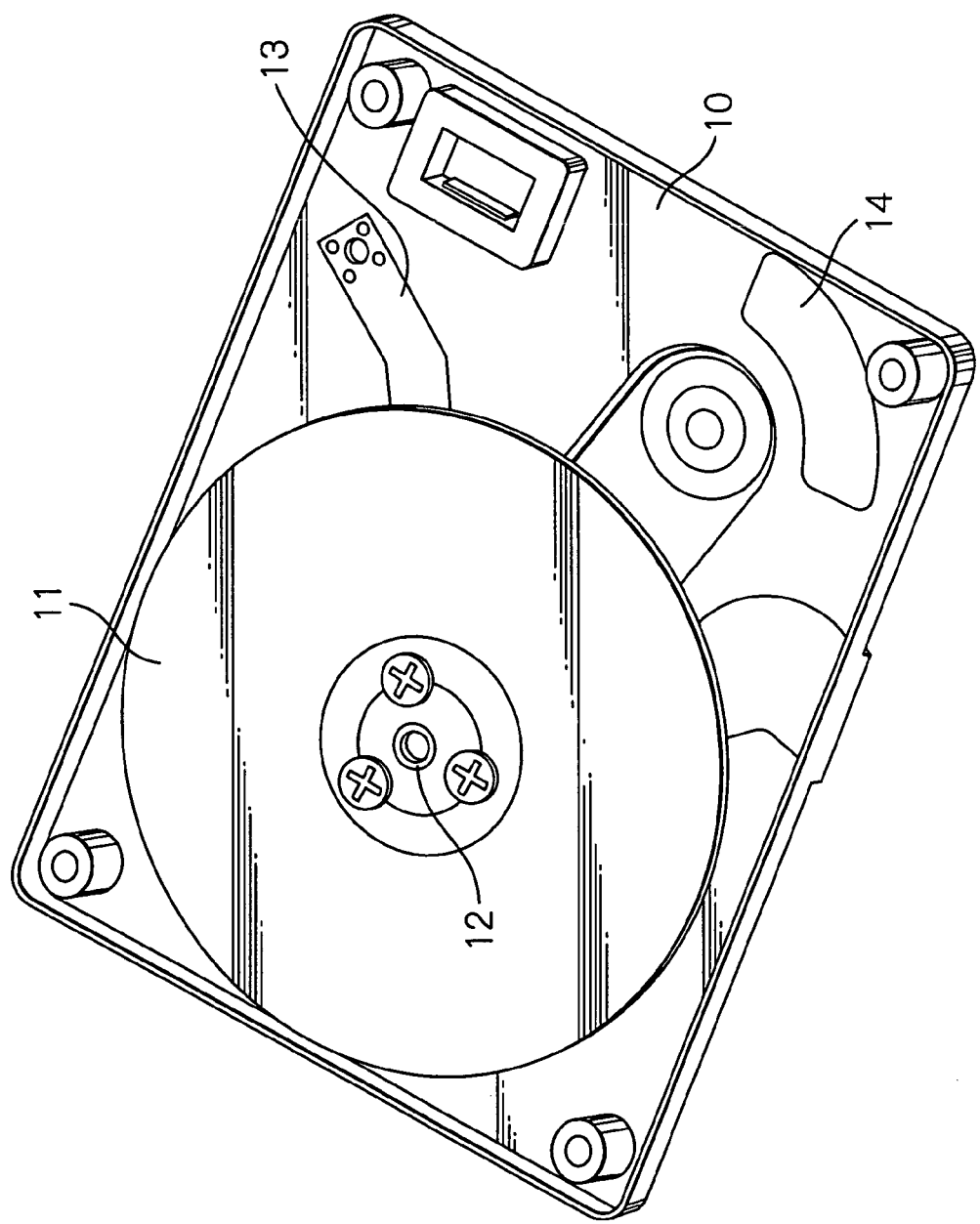
FIG. 1 shows an oblique view schematically illustrating configuration of a housing member side of an HDD apparatus as a preferred embodiment according to the present invention.
Figure 2:
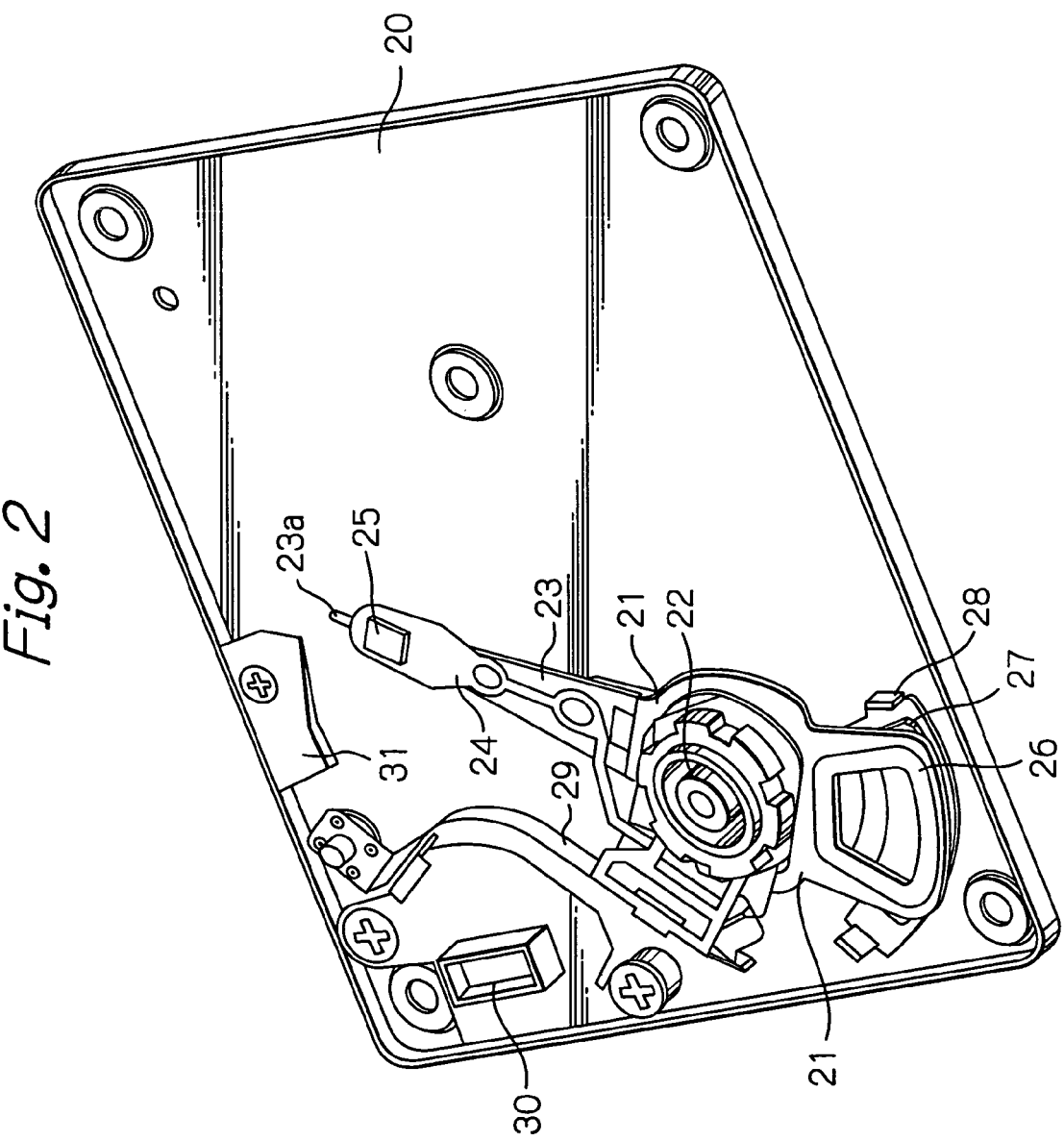
FIG. 2 shows an oblique view schematically illustrating configuration of a cover member side of the HDD apparatus in the embodiment of FIG. 1.

FIG. 1 schematically illustrates the configuration of a housing member side of an HDD apparatus as a preferred embodiment according to the present invention, and FIG. 2 schematically illustrates the configuration of a cover member side of this HDD apparatus.

In FIG. 1, reference numeral 10 denotes a housing member with one face opened, 11 denotes a single magnetic disk rotatably mounted on the housing member 10, 12 denotes an axis of a spindle motor (not shown) attached to the housing member 10 for rotating the magnetic disk 11, 13 denotes a lead conductor member for supplying power to the spindle motor, and 14 denotes a part of a yoke section of a VCM, which is attached to the housing member 10, respectively.

In FIG. 2, reference numeral 20 denotes a cover member for covering and closing the opened face of the housing member 10, and 21 denotes a support arm made of an extremely high stiffness member and attached to a horizontal rotation axis 22 that is fixed to the cover member 20. The support arm 21 can rotate in a plane parallel to the magnetic disk 11. In FIG. 2, also, reference numeral 23 denotes a load beam made of a high stiffness member or configured to have high stiffness. This load beam 23 is fixed to the support arm 21 at the top end side with respect to the horizontal rotation axis 22.

In FIG. 2, further, reference numeral 23a denotes a lift tab formed at the top end of the load beam 23, for keeping the HGA separated from the magnetic disk surface when the magnetic head is out of operation, 24 denotes a resilient flexure fixed to the load beam 23, 25 denotes a magnetic head slider mounted on the flexure 24 and provided with a thin-film magnetic head element consisting of a write head element and an MR read head element such as a GMR head element or a TMR head element, 26 denotes a coil section of the VCM, attached to the support arm 21 at the rear end side with respect to the horizontal rotation axis 22 for rotating this support arm 21, 27 denotes a magnet section of the VCM, fixed to the cover member 20, 28 denotes the remaining part of the yoke section of the VCM, fixed to the cover member 20, 29 denotes an external connection conductor member for the thin-film magnetic head element and the coil section of the VCM, 30 denotes a connector connected to the external connection conductor 29 and provided with a head amplifier for amplifying a signal from the thin-film magnetic head element, and 31 denotes a ramp attached to the cover member 20, on which the lift tab of 23a of the suspension sits when the magnetic head is out of operation, respectively. The external connection conductor member 29 consists of for example a flexible print circuit (FPC) formed by a base resin layer, conductors laminated on the base resin layer and a coating resin layer, and has an IC chip.

The flexure 24 in this embodiment is made of a resilient metal plate and has a flexible tongue (not shown) at its top end section. This tongue flexibly supports the magnetic head slider 25 to provide stability in the flying attitude of the slider. On the flexure 24, a lead conductor member including a plurality of trace conductors for passing a sense current and a write current to the thin-film magnetic head and signals from the thin-film magnetic head is formed. This lead conductor member is electrically connected to the aforementioned external connection conductor member 29. The lead conductor member may be configured by directly depositing layers on the surface of the flexure 24 or by adhering a separately formed FPC on the surface of the flexure 24.

The suspension is configured by assembling the load beam 23 and the flexure 24, and the HGA is configured by assembling the suspension, the magnetic head slider 25 and the lead conductor member.

Figure 3:
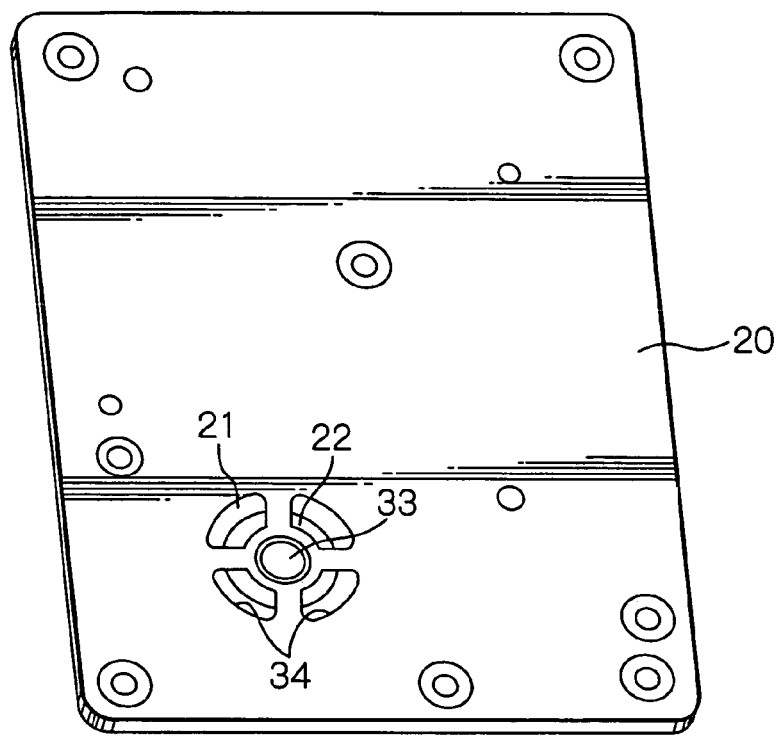
FIG. 3 shows an oblique view illustrating the cover member with a horizontal rotation axis fixed thereto, seen from its backside, in the embodiment of FIG. 1.
Figure 4:
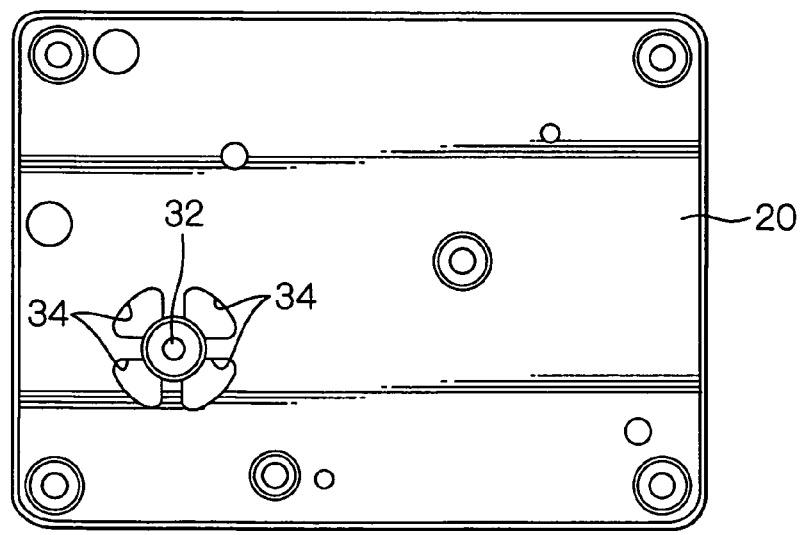
FIG. 4 shows a plane view illustrating configuration of the cover member before the horizontal rotation axis and a support arm are attached thereto in the embodiment of FIG. 1.

FIG. 3 illustrates the cover member with the horizontal rotation axis fixed thereto, seen from its backside, in this embodiment, and FIG. 4 illustrates configuration of the cover member before the horizontal rotation axis and the support arm are attached thereto in this embodiment.

A head arm assembly (HAA) consisting of the support arm 21, the horizontal rotation axis 22, the coil section 26 of the VCM and the like is fixed to the horizontal rotation axis 22 by a screw 33 passing through a clamping hole 32 of the cover member 20 and screwed-in a screw hole of the horizontal rotation axis 22.

As shown in these figures, a local deformation structure consisting of a plurality of cut-in holes 34 is formed around the clamping hole 32. When screwing, only a region of these cut-in holes 34 is locally deformed by the stress applied to the clamping hole 32 due to the screwing. Therefore, even if the screw 33 is tightly screwed in the clamping hole 32 in order to fix the HAA to the cover member 20, only the cut-in holes of the cover member 20 are deformed but the whole of the cover member 20 is never deformed. As a result, in case that the main components except for the magnetic disk and the motor are mounted on the cover member 20, it is possible to precisely keep the distance between these main components and the housing member. Particularly, because the whole of the cover member 20 is prevented from deformation, a distance between the ramp 31 attached to the cover member 20 and the housing member 10 can be set and kept extremely in precise.

Figure 5:
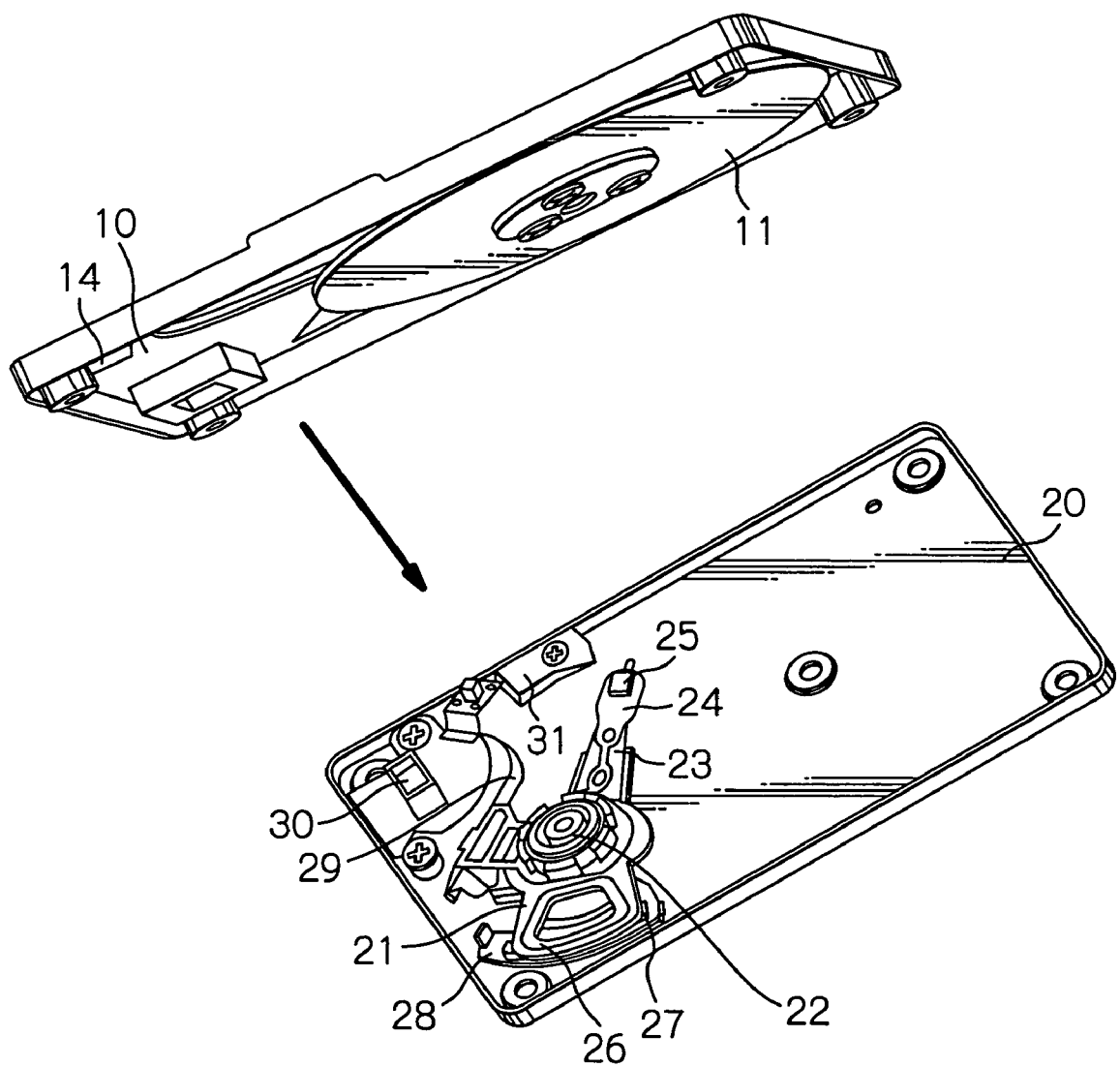
FIG. 5 shows an exploded oblique view illustrating assembling of the HDD apparatus by attaching the cover member to the housing member in the embodiment of FIG. 1.

FIG. 5 illustrates assembling of the HDD apparatus by attaching the cover member to the housing member in this embodiment.

As shown in the figure, the magnetic disk 11, the spindle motor and a part 14 of the yoke section of the VCM are preliminarily attached to the housing member 10, and the horizontal rotation axis 22, the support arm 21, the coil section 26 of the VCM, the magnet section 27 of the VCM, the external connection conductor member 29, the connector 30 and the ramp 31 are preliminarily attached to the cover member 20. Then, the cover member 20 is fixed to the housing member 10 to cover and seal the opened face of this housing member 10, so as to provide the HDD apparatus.

According to the embodiment, the support arm 21 with the HGA having the magnetic head slider 25 and the suspension are attached to the cover member 20, whereas the magnetic disk 11 and the spindle motor are attached to the housing member 10. Therefore, it is possible to assemble the HGA in isolation from the housing member 10 provided with the magnetic disk 11 of which surface has to keep clean, resulting that flexibility of tools or devices used for assembling the HGA can be increased and also assembling itself can be performed with a high degree of efficiency. Furthermore, when replacing the HGA already assembled in the HDD apparatus, the replacement work can be performed by detaching only the cover member 20 from the HDD apparatus, namely by treating only the cover member 20 in isolation from the housing member 10, no contamination of the disk surface can be induced and also the replacement can be effectively executed.

When assembling the HDD apparatus, first, to the housing member 10, a motor assembly consisting of the spindle motor, the magnetic disk 11 and the like, the part 14 of the yoke section of the VCM, and other necessary components are preliminarily attached.

On the other hand, to the cover member 20, the HAA consisting of the support arm 21 to which the HGA except for the magnetic head slider 25 is mounted, the horizontal rotation axis 22, the coil section 26 of the VCM and the like, a VCM-yoke assembly consisting of the magnet section 27 of the VCM and the remaining part 28 of the yoke section of the VCM, the external connection conductor member 29 including the connector 30, the ramp 31, and other necessary components are preliminarily attached.

Just before the cover member 20 is fixed to the housing member 10 after all the necessary components are attached to this cover member 20, the magnetic head slider 25 is mounted on the flexure 24 of the HGA. The mounting of the magnetic head slider 25 on the flexure 24 is performed by solder ball bonding (SBB). That is, electrical connections of terminal electrodes formed on an element formed surface or trailing surface of the magnetic head slider 25 with connection pads 32 that are a part of the lead conductor member are performed by SBB using solder balls, and also mechanical fixing of the magnetic head slider 25 to the suspension is performed by SBB using solder balls disposed between the trailing surface 25a and/or a surface deferent from the trailing surface of the magnetic head slider 25 and the flexure 24.

Because SBB is used for both the electrical connection and the mechanical connection of the slider 25, no clamping tool utilized in the ultrasonic gold ball bonding (GBB) process is necessary to use. Therefore, it is possible to mount the magnetic head slider 25 even after the assembling of the HGA. Also, because the mechanical fixing of the magnetic head slider 25 to the suspension is performed by SBB, the resin-feeding process and the resin-curing process that are necessary when resin adhesive is used for fixing can be omitted resulting the manufacturing process to simplify. Furthermore, if it is necessary to detach the magnetic head slider 25 from the HGA, since the mechanical fixing is executed by SBB, the slider 25 and the flexure 24 can be extremely easily separated from each other by heating the solder balls and by sucking and removing thus molten solder in a vacuum.

Thereafter, the cover member 20 is fixed to the housing member 10 to close the opened face of the housing member 10 to finish the HDD apparatus.

As aforementioned, an HGA with no magnetic head slider that is easily destructed by ESD is first attached to the cover member 20, and then the magnetic head slider 25 is mounted on this HGA just before the cover member 20 is fixed to the housing member 10. Therefore, according to this embodiment, ESD destruction of the magnetic head slider 25 can be effectively suppressed.

In the above-mentioned embodiment, the HDD apparatus has the plurality cut-in holes as the local deformation structure. However, in a modification, the HDD apparatus may have a single cut-in hole or other structure capable of being locally deformed. Also, such local deformation structure may be formed at a region around a hole other than the HAA clamping hole of the HDD apparatus, to which some stress may be applied.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic disk drive apparatus comprising:
a housing member with at least one opened face;
a cover member for covering said at least one opened face of said housing member;
a head gimbal assembly including a magnetic head slider and a suspension for supporting said magnetic head slider;
a support arm for supporting said head gimbal assembly;
a magnetic disk to which said magnetic head slider is opposed; and
a motor for rotating said magnetic disk,
said magnetic disk and said motor being attached to said housing member, said support arm being fixed to said cover member using a clamping hole formed through said cover member, and said cover member having a local deformation structure formed around said clamping hole so that said cover member is configured to locally deform.

2. The apparatus as claimed in claim 1, wherein said local deformation structure comprises a plurality of cut-in holes formed around said clamping hole.

3. The apparatus as claimed in claim 1, wherein said clamping hole is a screw hole coaxially with a rotation axis of said support arm.

4. The apparatus as claimed in claim 1, wherein said apparatus further comprises a ramp preliminarily attached to said cover member, on which said support arm sits when the apparatus is out of operation.

5. The apparatus as claimed in claim 1, wherein said apparatus further comprises an actuator for rotatively moving said support arm in parallel with a surface of said magnetic disk, a part of said actuator being attached to said cover member.

6. The apparatus as claimed in claim 5, wherein the remaining part of said actuator is attached to said housing member.

7. The apparatus as claimed in claim 1, wherein said local deformation structure is integrated with said cover member.

\* \* \* \* \*